United States Patent [19]

Nashimoto

[11] Patent Number: 5,677,970
[45] Date of Patent: Oct. 14, 1997

[54] OPTICAL SCANNING DEVICE AND IMAGE FORMING APPARATUS USING THE SAME

[75] Inventor: Keiichi Nashimoto, Minami-ashigara, Japan

[73] Assignee: Fuji Xerox, Tokyo, Japan

[21] Appl. No.: 654,327

[22] Filed: May 28, 1996

[30] Foreign Application Priority Data

May 29, 1995 [JP] Japan .................................. 7-152743

[51] Int. Cl.$^6$ ..................................................... G02B 6/10
[52] U.S. Cl. ...................................................... 385/7; 385/10
[58] Field of Search ..................................... 385/7, 8, 9, 10, 385/41, 42

[56] References Cited

U.S. PATENT DOCUMENTS

| | | | |
|---|---|---|---|
| 3,919,669 | 11/1975 | Hartemann | 385/7 |
| 4,929,042 | 5/1990 | Hatori et al. | 350/96.13 |
| 4,941,722 | 7/1990 | Hatori | 385/7 |

FOREIGN PATENT DOCUMENTS

| | | |
|---|---|---|
| 52-68307 | 6/1977 | Japan . |
| 63-64765 | 12/1988 | Japan . |

OTHER PUBLICATIONS

IEEE Transactions on Circuits and Systems, vol. CAS–20, No. 12, Dec. 1979, "Guided–Wave Acoustooptic Bragg Modulators for Wide–Band Integrated Optic Communications and Signal Processing", Chen. S. TSAI, pp. 1072–1098.

Technical Report of the Institute of Electronics, Information and Communication Engineers, OGE85–177 (1986), Nobuharu Nozaki et al., pp. 43–48.

Technical Report of the Institute of Electronics, Information and Communication Engineers, OGE88–139 (1989), Masami Hatori et al., pp. 9–15.

*Primary Examiner*—John Ngo
*Attorney, Agent, or Firm*—Oliff & Berridge

[57] ABSTRACT

An optical scanning device of the thin film waveguide type, which has a scanning speed and excellent scanning accuracy that can be used in a laser beam printer, a digital copier, a facsimile apparatus or the like, and an image forming apparatus using the optical scanning device are disclosed. The optical scanning device comprising: a thin film waveguide; a light source for emitting a plurality of laser beams to the thin film waveguide; a comb-like electrode for exciting a surface acoustic wave for deflecting the laser beams in the thin film waveguide; and a plurality of emitting means for emitting the deflected laser beams to an outside of the thin film waveguide, the emitting means being equal in number to the laser beams is disclosed. In an embodiment, the plurality of emitting means are located at the same position in a traveling direction of the incident laser beams, and have different emittance angles. In another embodiment, the plurality of emitting means are located at different positions in a traveling direction of the incident laser beams, and have the same emittance angle.

15 Claims, 9 Drawing Sheets

OPTICAL SCANNING DEVICE AND IMAGE FORMING APPARATUS USING THE SAME

FIELD OF THE INVENTION

The invention relates to an optical scanning device comprising: a thin film waveguide; a light source which emits a laser beam into the thin film waveguide; and an electrode which excites a surface acoustic wave for deflecting the laser beam in the thin film waveguide, and relates to an image forming apparatus using the device.

BACKGROUND OF THE INVENTION

A typical laser beam optical scanning apparatus which is used in a laser beam printer, a digital copier, a facsimile apparatus or the like comprises a polygon mirror which deflects a beam from a gas laser or a semiconductor laser, and an fθ lens which focuses the laser beam reflected from the polygon mirror, in a state of a uniform linear motion on an image forming face of a photoreceptor or the like. In such an optical scanning apparatus using a polygon mirror, since the polygon mirror is rotated at a high speed by a motor, there arise problems of reduced durability and generation of noise, and a further problem in that the optical scanning speed is limited by the number of revolutions of the motor.

On the other hand, as a solid state laser beam optical deflecting apparatus, known are optical deflecting devices using the acoustooptic effect. Among such devices, a device of the optical waveguide type promises well (for example, C. S. Tsai, IEEE Trans. Circuits and Syst., vol. CAS-26 (1979) 1072). As a laser beam optical scanning device which may solve the defects of a laser beam optical scanning apparatus using a polygon mirror, application of such an optical waveguide device to a printer or the like is studied as described in Nozaki et al., Technical Report of The Institute of Electronics, Information and Communication Engineers, OQE85-177(1986) 43; and Hatori, et al., Technical Report of The Institute of Electronics, Information and Communication Engineers, OQE88-139(1989) 9. As disclosed in JP-A-52-68307 (The term "JP-A" used herein means an "unexamined published Japanese patent application") and JP-B-63-64765 (The term "JP-B" used herein means an "examined Japanese patent publication"), such an optical deflecting device of the optical waveguide type comprises: an optical waveguide made of $LiNbO_3$, $ZnO$ or the like; means for coupling a laser beam into the optical waveguide; a comb-like electrode for exciting a surface acoustic wave for deflecting the laser beam in the optical waveguide by means of the acoustooptic effect; and means for outputting the deflected laser beam from the optical waveguide. As required, the device may further comprise a thin film lens, etc. The optical deflecting device of the optical waveguide type has advantages of noiseless, high reliability and reduced size.

However, the conventional optical deflecting device of the optical waveguide type is disadvantageous in that the density of the laser exposure energy reaching a photoreceptor is reduced by, for example, optical losses occurring when laser light enters the optical waveguide, when the laser light is scattered in the optical waveguide, when the laser light is optically deflected by means of the acoustooptic effect, and when the laser light is output from the optical waveguide. Further, the upper limit of the laser scanning speed is imposed by the speed limitation in optical deflection due to the acoustooptic effect. Moreover, the upper limit of the laser recording speed is imposed due to the limitation of the modulation speed of the laser driver. In order to practically use the device, it is required to solve these problems.

The present invention has been achieved to solve the above-discussed problems of the prior art.

SUMMARY OF THE INVENTION

Therefore, it is an object of the invention to provide a laser optical scanning device which is an optical scanning device of the thin film waveguide type using the acoustooptic effect, in which reduction of the density of the laser exposure energy reaching a photoreceptor is prevented from occurring, such reduction being caused by attenuation of laser light due to scattering of the light in the thin film waveguide, the speed of optical deflection due to the acoustooptic effect is improved, and the laser recording speed is improved, and which therefore has a scanning speed and excellent scanning accuracy that can be used in a laser beam printer, a digital copier, a facsimile apparatus, or the like.

It is another object of the invention to provide an image forming apparatus in which the optical scanning device is used.

The optical scanning device comprising: a thin film waveguide; a light source for emitting a plurality of laser beams to the thin film waveguide; a comb-like electrode for exciting a surface acoustic wave for deflecting the laser beams in the thin film waveguide; and a plurality of emitting means for emitting the deflected laser beams to an outside of the thin film waveguide, the emitting means being equal in number to the laser beams is disclosed.

In an embodiment, the plurality of emitting means are located at the same position in a traveling direction of the incident laser beams, and have different emittance angles.

In another embodiment, the plurality of emitting means are located at different positions in a traveling direction of the incident laser beams, and have the same emittance angle. When the number of said plurality of emitting means is three or more, the emittance positions are preferably set to be at equal intervals.

The image forming apparatus of the invention comprises: a photoreceptor; charging means for uniformly charging the photoreceptor; exposure means for irradiating the photoreceptor with light to form a latent image; and developing means for visualizing the latent image, wherein the exposure means comprises the above-mentioned optical scanning device.

The above and other objects and features of the present invention will be more apparent from the following description taken in conjunction with the accompanying drawing.

DETAILED DESCRIPTION OF THE INVENTION

The invention will be described in detail below.

The optical scanning device of the invention comprises a light source such as a plurality of lasers which emit plural laser beams to a thin film waveguide, or a laser array which oscillates plural laser beams, and coupling means for the light source. In the thin film waveguide, disposed are a thin film lens, as required, which shapes the laser beams, a comb-like electrode for exciting a surface acoustic wave (SAW) for deflecting the laser beams, and emitting means for emitting the deflected laser beams to the outside of the thin film waveguide such as a plurality of gratings or prisms.

Figure 1:
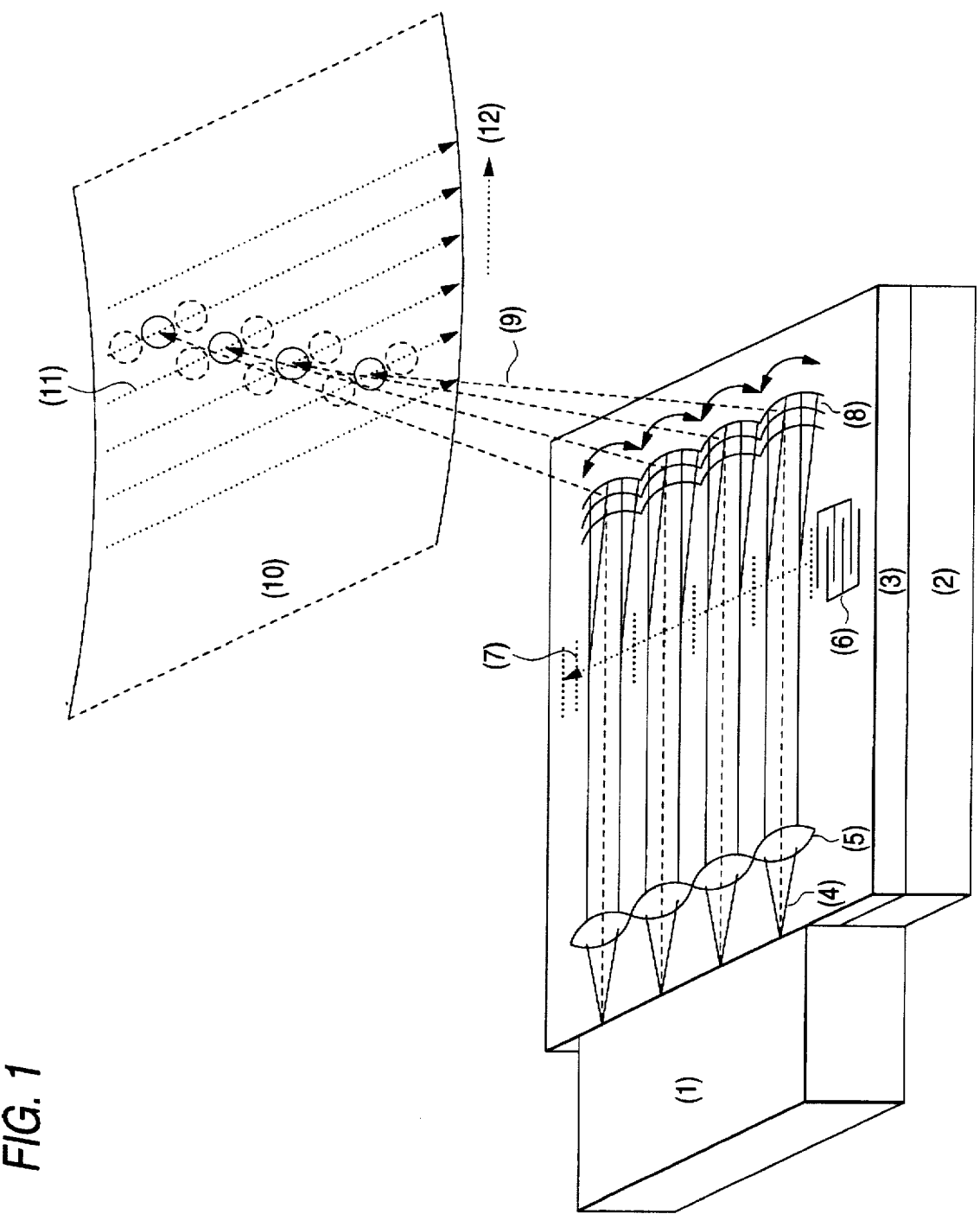
FIG. 1 is a diagram of an embodiment of the optical scanning device according to the present invention in which a 4-spot laser diode array is used.
Figure 3:
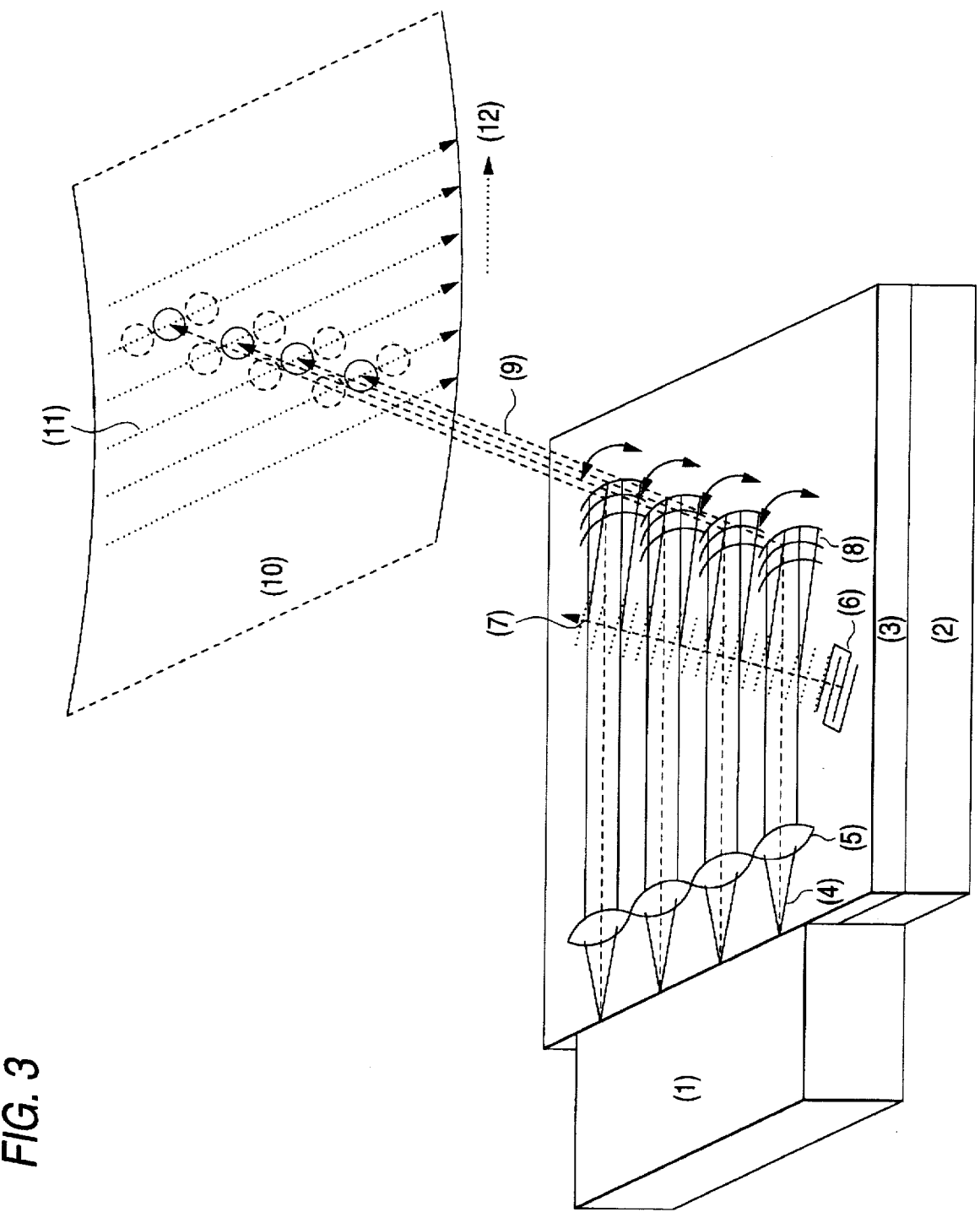
FIG. 3 is a diagram showing another embodiment of the optical scanning device according to the present invention in which a 4-spot laser diode array is used.

In the present invention, the deflected laser beams are emitted to the outside of the thin film waveguide in one of the following manners: (a) as shown in FIG. 1, the plurality of emitting means are each located at the same position of the thin film waveguide in the traveling direction of the incident laser beams and have different emittance angles, thereby allowing plural lines of the photoreceptor to be subjected to a simultaneous scanning operation or an interlace scanning operation; and (b) as shown in FIG. 3, the plurality of emitting means are each located at different positions of the thin film waveguide in the traveling direction of the incident laser beams and have the same emittance angle, thereby allowing plural lines of the photoreceptor to be subjected to a simultaneous scanning operation or an interlace scanning operation. The constitution in which the emitting means have different emittance angles is realized by, when a plurality of gratings are used, for example, making the gratings different from each other in material or adjusting the widths of the gratings, or by, when a plurality of prisms are used, making the prisms different from each other in material, shape, etc.

The laser beams emitted form the thin film waveguide are used through an optical system such as an fθ lens, for exposing the photoreceptor. The laser scanning is conducted by the simultaneous or interlace scanning operation for plural lines in the subscanning direction (rotational direction) of the photosensitive drum or belt.

In the present invention, typical examples of the material constituting the thin film waveguide include $LiNbO_3$, $LiTaO_3$, ZnO, $Pb(Zr, Ti)O_3$ (hereinafter, referred to as "PZT"), $(Pb, La)(Zr, Ti)O_3$ (hereinafter, referred to as "PLZT"), etc. When $LiNbO_3$ is used as the material, the thin film waveguide may be produced, for example, by depositing Ti on a single crystal $LiNbO_3$ wafer and then diffusing Ti into $LiNbO_3$ at about 1,000° C., by conducting a vapor phase epitaxial growth of an $LiNbO_3$ thin film on a single crystal $LiTaO_3$ substrate by the Rf-magnetron sputtering method, or by conducting a solid phase epitaxial growth of an $LiNbO_3$ thin film on a single crystal $\alpha$-$Al_2O_3$ substrate by the sol-gel method. When ZnO is used, the thin film waveguide may be produced, for example, by forming a c-axis orientation ZnO thin film on a glass substrate by the electron beam vapor deposition or the Rf-magnetron sputtering method. When PLZT is used, the thin film waveguide may be produced, for example, by conducting a vapor phase epitaxial growth of a PLZT thin film on an MgO substrate by the ion beam sputtering method, by conducting a vapor phase epitaxial growth of a PLZT thin film by the Rf-magnetron sputtering method on an epitaxial MgO buffer layer formed on a GaAs substrate, or by conducting a solid phase epitaxial growth of a PLZT thin film on an $SrTiO_3$ substrate by the sol-gel method.

Specific examples of lasers useful as the light source include gas lasers such as He—Ne, compound semiconductor lasers such as AlGaAs, laser arrays thereof, etc. Laser light generated by laser oscillation is introduced into the thin film waveguide by, for example, a method selected from the prism coupling method, the butt coupling (or end coupling) method, the grating coupling method and the evanescent field coupling method. Preferred examples of the thin film lens, which is disposed in the thin film waveguide as required to shape laser beams, include a mode index lens, a Luneburg lens, a geodesic lens, a Fresnel lens, a grating lens, etc.

In the invention, examples of the comb-like electrode for exciting a SAW for diffracting and deflecting the laser beams in the thin film waveguide, include a parallel comb-like electrode, a chirp electrode in which the pitch of electrode fingers is changed in the SAW propagation direction, an electrode set of a plurality of the above electrodes which are arranged at different angles, a chirp electrode in which angles are formed between electrode fingers, a curved interdigital electrode, a curved electrode in which the distances between electrode fingers are changed in the longitudinal direction of the electrode, and an electrode set of a plurality of electrodes which have different electrode finger pitches and are arranged at different angles. The laser beams in the thin film waveguide may be subjected to multiple diffraction by using any of the above electrodes.

Examples of the means for emitting the laser beams from the thin film waveguide suitably include a prism coupler, a grating coupler, a focusing coupler, a SAW grating coupler, etc.

In general, an optical modulating device due to the waveguide acoustooptic (AO) effect is divided into an ultrasonic wave source and an ultrasonic wave medium. The ultrasonic wave medium is required to have physical properties in which the refractive index n (a tensor of second order) and the photoelastic coefficient e (a tensor of fourth order) are large, and the density ρ and the ultrasonic wave speed v are small. The performance index M of the medium is indicated by the following expression:

$$M = n^6 e^2 / \rho v^3 \qquad [1]$$

With respect to the piezoelectric effect, the electric polarization D and the strain S are indicated as functions of the electric field E and the stress T as follows:

$$D = dT + \epsilon TE \qquad [2]$$

$$S = sET + dE \qquad [3]$$

where d is the piezoelectric coefficient, sE the elastic modulus, and $\epsilon T$ the dielectric constant.

The ultrasonic wave source functions by the piezoelectric effect utilizing the strain S with respect to the input of the electric field E. Accordingly, the ultrasonic wave source is required to have physical properties of high piezoelectric coefficient d (a tensor of third order) and high electromechanical coupling coefficient k (a tensor of third order) which represents a ratio of the energy converted into mechanical energy to the supplied electric energy.

As a thin film device, it is advantageous to use a piezoelectric material which serves an ultrasonic wave source and also as an ultrasonic wave medium. That is, a material in which the performance index M and the electromechanical coupling coefficient k are high is required. When the piezoelectric effect of a ferroelectric material is to be used, therefore, typical examples of the material of the optical waveguide include $LiNbO_3$, $LiTaO_3$, $ZnO$, PZT, PLZT, etc. Particularly, an optical waveguide such as that produced by conducting a vapor phase epitaxial growth of an $LiNbO_3$ thin film on a single crystal $\alpha$-$Al_2O_3$ substrate by the Rf-magnetron sputtering method is preferably used.

When the piezoelectric effect of an $LiNbO_3$ thin film is used, a surface acoustic wave (SAW) can be excited through a transducer. The SAW causes the refractive index of the thin film to be periodically changed so that laser light which is coupled into the ferroelectric thin film and crosses the SAW is subjected to the Bragg reflection due to the acoustooptic effect under the Bragg condition indicated by the following expression:

$$m\lambda = 2\Lambda \sin \theta_B \qquad [4]$$

where m is the order of the diffracted laser, $\lambda$ the wavelength of the laser, $\Lambda$ the wavelength of the SAW, and $\theta_B$ the Bragg angle (angle of deflection×½).

In the acoustooptic (AO) modulation, the Bragg reflection condition is indicated also by the magnitude of Q in the following expression:

$$Q = 2\pi\lambda L/n\Lambda^2 > 1 \qquad [5]$$

In expression [5] above, L is the beam width of the SAW. When Q<1, there occurs the Raman-Nath diffraction.

In this case, when the input frequency of the transducer is modulated, the wavelength $\Lambda$ of the SAW is changed so that the Bragg angle $\theta_B$ is changed, thereby allowing the laser light to be used in a scanning operation.

The frequency sweep is usually conducted by digital modulation. The frequency of the SAW crossing the width of incident laser beams is changed at an appropriate step, and that of the SAW over the laser beam width is constant. The angle of deflection in the AO digital modulation is determined in the manner described below. In a medium of the effective refractive index n, the wavelength of light has the following relationships with respect to the wavelength $\lambda_0$ of light in vacuum:

$$\lambda = \lambda_0/n \qquad [6]$$

When the frequency of the SAW is indicated by f and the speed of the SAW by v, therefore, the angle of deflection $2\theta_B$ with respect to the incident light is obtained from expression [4] as follows:

$$2\theta_B = 2\sin^{-1}(\lambda/2\Lambda) = 2\sin^{-1}(\lambda_0/2n\Lambda) \qquad [7]$$
$$= 2\sin^{-1}(\lambda_0 f/2nv) = 2 \cdot \lambda_0 f/2nv$$
$$= \lambda_0 f/nv (= \lambda_0/n\Lambda) \text{ (when } \theta_B \text{ is small)}$$

From expression [7], an angle of deflection $2\Delta\theta_B$ in a frequency band $\Delta f$ of the SAW is obtained as follows:

$$2\Delta\theta_B = \lambda_0 \Delta f/nv \qquad [8]$$

This angle of deflection can be increased by increasing the frequency and band of the SAW, or by suitably selecting a material in which the refractive index and the SAW speed are low. The increase of the frequency and band of the SAW may be attained by a chirp electrode in which the pitch of electrode fingers is changed in the SAW propagation direction, a chirp electrode in which angles are formed between electrode fingers, a curved interdigital electrode, a curved electrode in which the distances between electrode fingers are changed in the longitudinal direction of the electrode, or the like. In addition to the above, effective measures include: a method in which the band is driven by a plurality of transducers, with dividing it by an electrode set wherein a plurality of chirp electrodes in each of which the pitch of electrodes is changed in the SAW propagation direction are arranged at different angles, a plurality of electrodes which have different electrode pitches and are arranged at different angles, or the like; the double diffraction method; and the multiple diffraction method.

In the AO digital modulation, the spot diameter, the number of spots, and the spot moving time are determined by the following expressions. When the width of the laser beams in the thin film waveguide is indicated by $D_1$ and the focal length of an imaging lens by $F_1$, the diffraction limit spot diameter $2\omega$ (1/$e^2$ diameter) is indicated by:

$$2_\omega = (4/\pi) \cdot (\lambda \cdot F_1/D_1) \qquad [9]$$

and the resolution laser spot number $N_d$ is indicated by the following expression:

$$N_d = 2\Delta\theta_B \cdot F/2\omega = (\pi/4) \cdot \tau \cdot \Delta f_d \qquad [10]$$

where $\tau$ is the passing time of the SAW with respect to the laser beam width. When the SAW is digital-modulated, the time corresponds to the spot moving time $t_d$. In order to shorten the time, it is possible to reduce the laser beam width or select a material in which the SAW speed is high.

$$t_d = \tau = (D_1/v) \qquad [11]$$

When $\Delta f_d$ is the frequency band of the SAW and $\delta f_d$ (=1/$\tau$) is a frequency change required for diffraction, the resolution laser spot number $N_d$ can be indicated also by the following expression:

$$N_d = \Delta f_d/\delta f_d = \tau \cdot \Delta f_d = D_1/v \cdot \Delta f_d \qquad [12]$$

Therefore, there are the relationships in which, when the spot moving time is shortened, the spot number is reduced, and, in order to increase the spot number, the spot moving time is lengthened. In order to increase the spot number without changing the spot moving time, it is effective to widen the band of the transducer.

From $\tau$ and $N_d$, the scanning speed (time) $t_d$ is approximately expressed as follows:

$$t_d = \tau \times N_d = \tau \times \tau \cdot \Delta f_d = \tau^2 \cdot \Delta f_d \qquad [13]$$

According to the method of the invention, a plurality of laser beams can be simultaneously used to scan so as to conduct exposure on the photoreceptor. When the number of the beams is indicated by m, the apparent scanning speed is expressed as follows:

$$t_m = t_s/m = (\tau \times N_d)/m = (\tau \times \tau \cdot \Delta f_d)/m \quad [14]$$

$$= (\tau^2 \cdot \Delta f_d)/m$$

In the case of analog modulation, the frequency of the SAW is continuously changed over the laser beam width, and hence the SAW functions as a Fresnel zone lens and the diffracted laser beams are used in a scanning operation and converge or diverge. In this case, when δfa is the frequency band of the analog SAW within the width of the laser beams, the focal length F and the spot diameter d at the focal point in the case of convergence are indicated as follows:

$$F = Dv/(\lambda \delta fa) = (v^2/\lambda) \cdot (\tau/\delta fa) \quad [15]$$

$$d = v/\delta fa \quad [16]$$

When Ta is the modulation sweep time (analog modulation time width) and Δfa is the frequency band of the SAW subjected to analog modulation, the scanning speed ta and the resolution laser spot number Na are as follows:

$$ta = Ta - \tau \quad [17]$$

$$Na = (Ta - \tau)/Ta \cdot (\tau \cdot \Delta fa) \quad [18]$$

According to the method of the invention, a plurality of laser beams can be simultaneously used to scan so as to conduct exposure on the photoreceptor. When the number of the beams is indicated by m, the apparent scanning speed is expressed as follows:

$$t_m = ta/m = (Ta - \tau)/m \quad [19]$$

In order to increase the spot number without changing the spot moving time, it is required to widen the band of the transducer. In this case, as the angle of deflection is increased, the following problems must be considered.

The diffraction efficiency is η approximately shown by the following expression:

$$\eta = \sin^2[\pi/4 \cdot I\{M \cdot P \cdot L/(d \cdot \lambda^2)\}^{1/2}] \quad [20]$$

wherein I is an overlap integral of guided light and the SAW, M is the performance index of the material of the thin film waveguide, P is the power of the SAW, and L is the interaction length of the guided light and the SAW.

When the frequency of the SAW is increased and the band of the sweep frequency is widened in order to increase the angle of deflection or the number of resolution spots, there arises a problem in that the diffraction efficiency is lowered. In order to obtain the angle of deflection of 10° or more, for example, the frequency of the SAW is made 1 GHz or higher. This causes the absorption of the SAW to be increased, thereby lowering the diffraction efficiency. When the band of the transducer is widened in order to widen the band of the sweep frequency, the excitation efficiency of the SAW is lowered, thereby producing a problem in that the diffraction efficiency is lowered. In order to prevent these problems from occurring, the employment of a method in which the required band is divided into portions and the divided band portions are respectively driven by several transducers, or the double diffraction method is effective.

FIG. 1 is a diagram of an embodiment of the optical scanning device according to the invention using a 4-spot laser diode array. In FIG. 1, (1) designates the 4-spot laser diode array, (2) designates an α-Al$_2$O$_3$ substrate, (3) designates a thin film waveguide, (4) designates incident laser beams, (5) designates mode index lenses, (6) designates a chirp electrode, (7) designates a surface acoustic wave, (8) designates gratings, (9) designates output laser beams, (10) designates a part of a photoreceptor, (11) designates the main scanning direction, and (12) designates the subscanning direction (rotational direction of the photosensitive drum). The laser beams (4) oscillated from the light sources of the 4-spot laser diode array (1) are introduced into the thin film waveguide at an angle of incidence having constant divergence. The introduced laser beams propagate in the thin film waveguide and are corrected by the mode index lenses (5), and then deflected by the surface acoustic wave (7) excited by the chirp electrode (6). It is shown that the four deflected laser beams are emitted to the outside of the thin film waveguide at different angles which are set to be at equal angular intervals, by the four gratings (8) which are located at the same position in the traveling direction in the thin film waveguide, thereby enabling four lines on the photoreceptor to be simultaneously scanned.

FIGS. 2(a) and 2(b) show schematic views of a printing system having the above described embodiment of the optical scanning device according to the invention using the 4-spot laser diode array. FIG. 2(a) is a schematic perspective view of the printing system, and FIG. 2(b) is a schematic plan view of the printing system. In FIGS. 2(a) and 2(b), (1) designates a 4-spot laser diode array, (9) designates output laser beams, (10) designates a part of a photoreceptor, (11) designates the main scanning direction, (12) designates the rotational direction of the photoreceptor, (13) designates the optical scanning device, and (14) designates an Fθ lens.

FIG. 3 is a diagram showing another embodiment of the optical scanning device according to the invention using a 4-spot laser diode array. In FIG. 3, (1) to (12) designate the same components as those of FIG. 1. The laser beams (4) oscillated from the light sources of the 4-spot laser diode array (1) are introduced into the thin film waveguide at an angle of incidence having constant divergence. The introduced laser beams propagate in the thin film waveguide and are corrected by the mode index lenses (5), and then deflected by the surface acoustic wave (7) excited by the chirp electrode (6). It is shown that the four deflected laser beams are emitted to the outside of the thin film waveguide by the four gratings (8) which are located at different positions in the traveling direction in the thin film waveguide and which have the same emittance angle, thereby enabling four lines on the photosensitive member to be simultaneously scanned.

FIGS. 4(a) and 4(b) show schematic views of a printing system having the above described embodiment of the optical scanning device according to the invention using the 4-spot laser diode array. FIG. 4(a) is a schematic perspective view of the printing system, and FIG. 4(b) is a schematic plan view of the printing system. In FIGS. 4(a) and 4(b), (1), and (9) to (14) designate the same components as those of FIG. 2.

Figure 5:
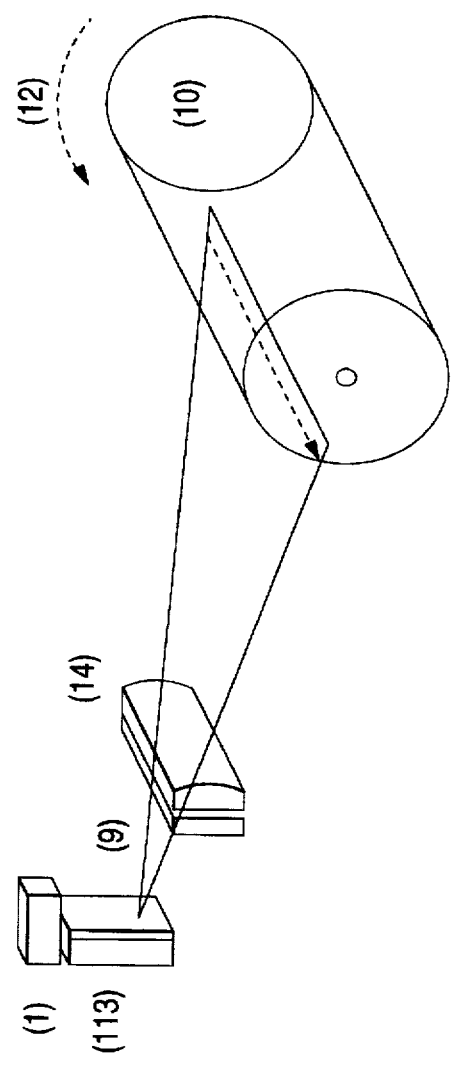
FIGS. 5(a) and 5(b) show schematic views of a printing system having a conventional optical scanning device in which a 4-spot laser diode array is used.
Figure 5:
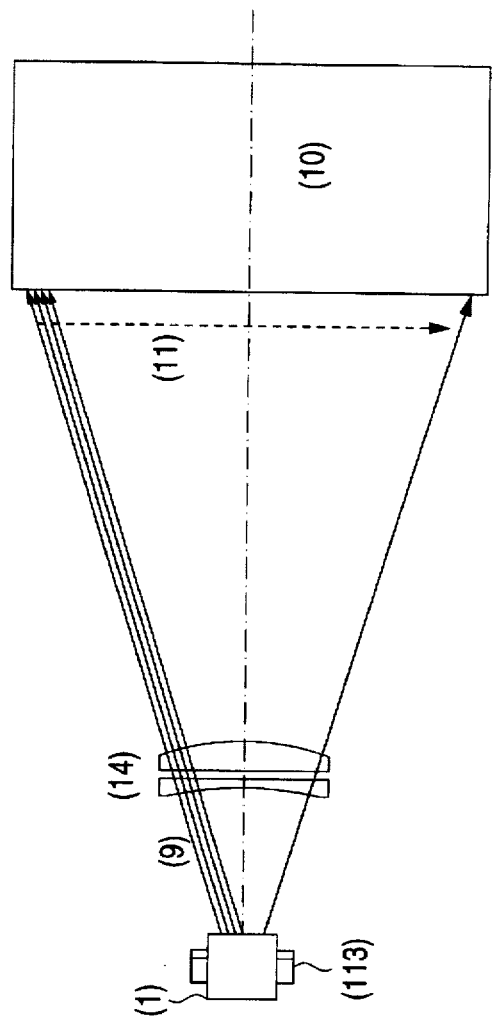

FIG. 5 shows schematic views of a printing system having a conventional optical scanning device (113) using a 4-spot laser diode array.

Figure 6:
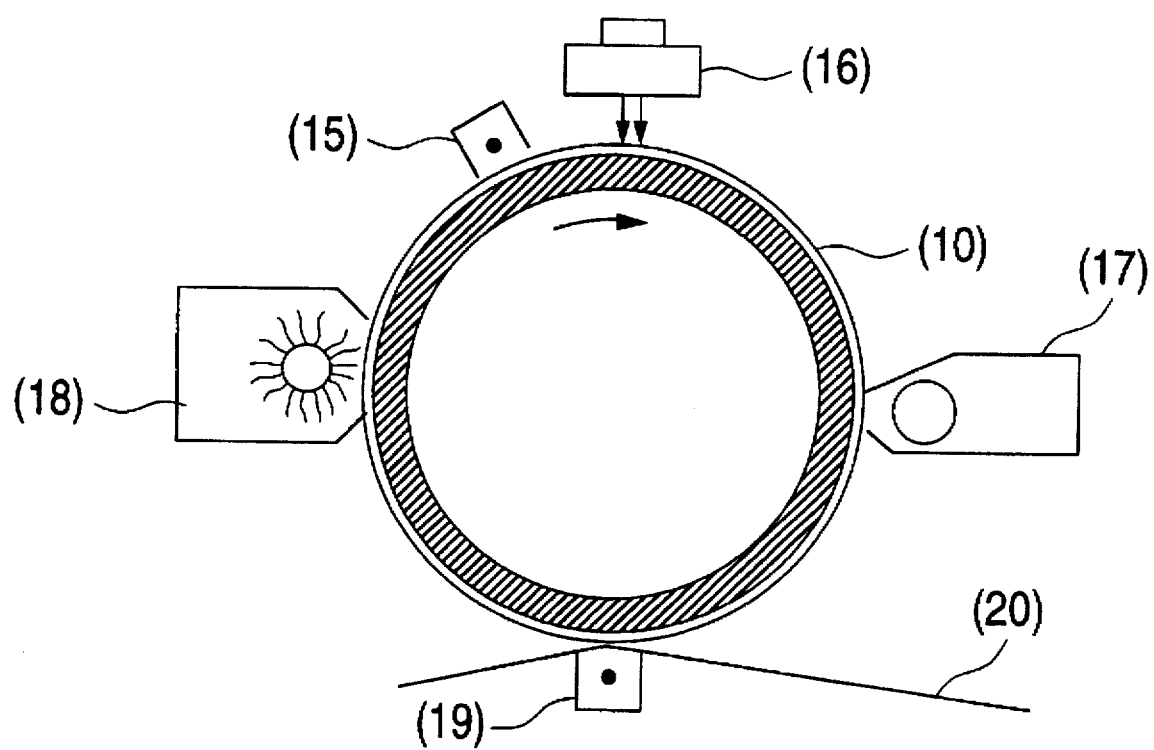
FIG. 6 is a diagram showing an embodiment of the image forming apparatus according to the present invention.

FIG. 6 is a diagram showing an embodiment of the image forming apparatus according to the invention. The image forming apparatus comprises a photoreceptor (10), charging means (15) for uniformly charging the photoreceptor, exposure means (16) for irradiating the photoreceptor with light to form a latent image, and developing means (17) for visualizing the latent image. As the exposure means, used is an optical scanning device comprising: a thin film waveguide; a light source for emitting a plurality of laser beams to the thin film waveguide; a comb-like electrode for exciting a surface acoustic wave for deflecting the laser beams in the thin film waveguide; and a plurality of emitting means for emitting the deflected laser beams to the outside of the thin film waveguide, the emitting means being equal in number to the laser beams. In the figure, (18) designates a cleaner, (19) designates a transfer device, and (20) designates a transfer sheet.

Figure 7:
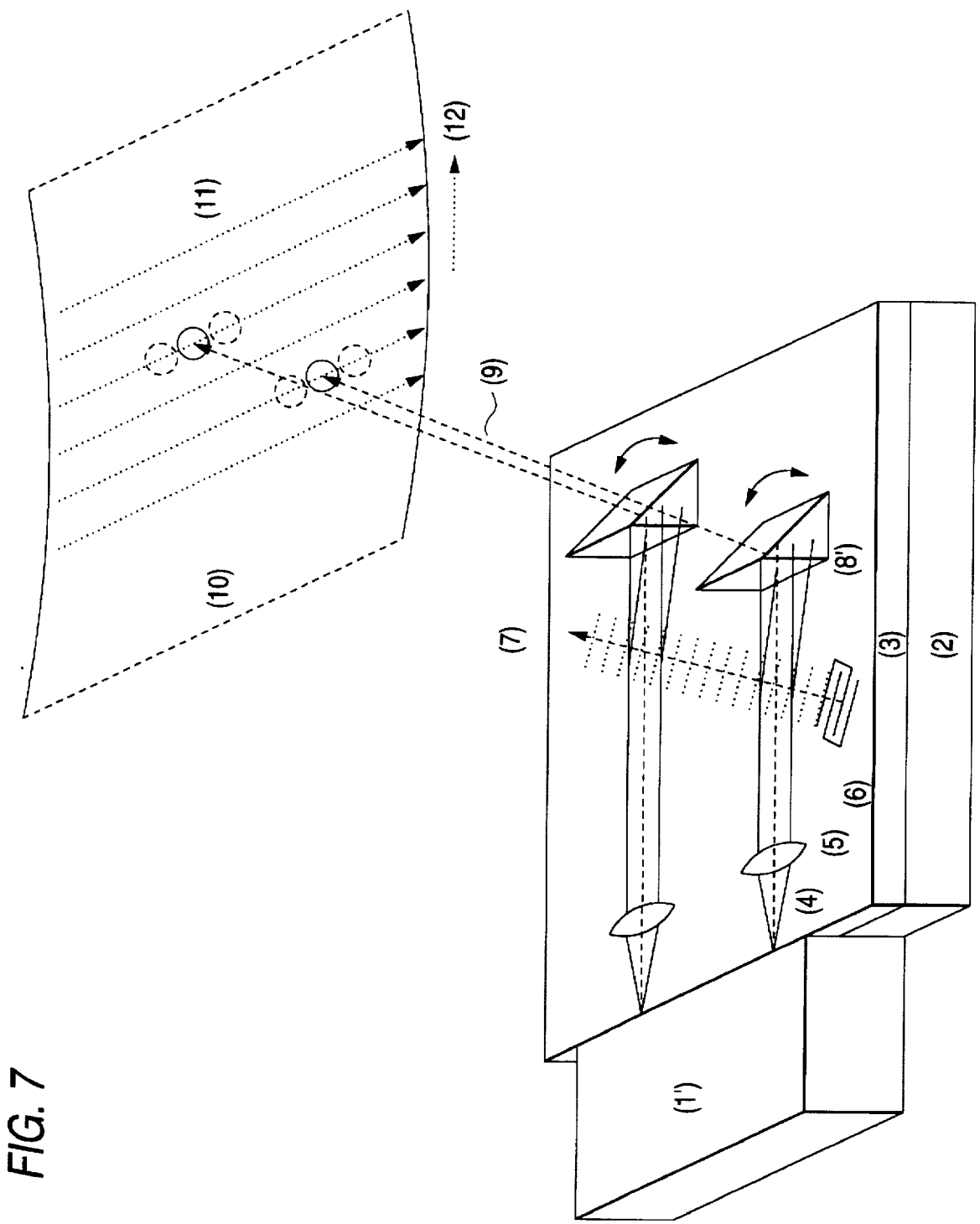
FIG. 7 is a diagram showing an interlace scanning operation for every two lines in the rotational direction of a photosensitive drum according to the present invention, using a dual-spot semiconductor laser and emission with two prisms.

FIG. 7 is a diagram showing an interlace scanning operation for every two lines in the rotational direction of a photosensitive drum according to the present invention, using emission with a dual-spot semiconductor laser and two prisms. In the figure, (1') designates the dual-spot semiconductor laser, and (8') designates the prisms.

Figure 8:
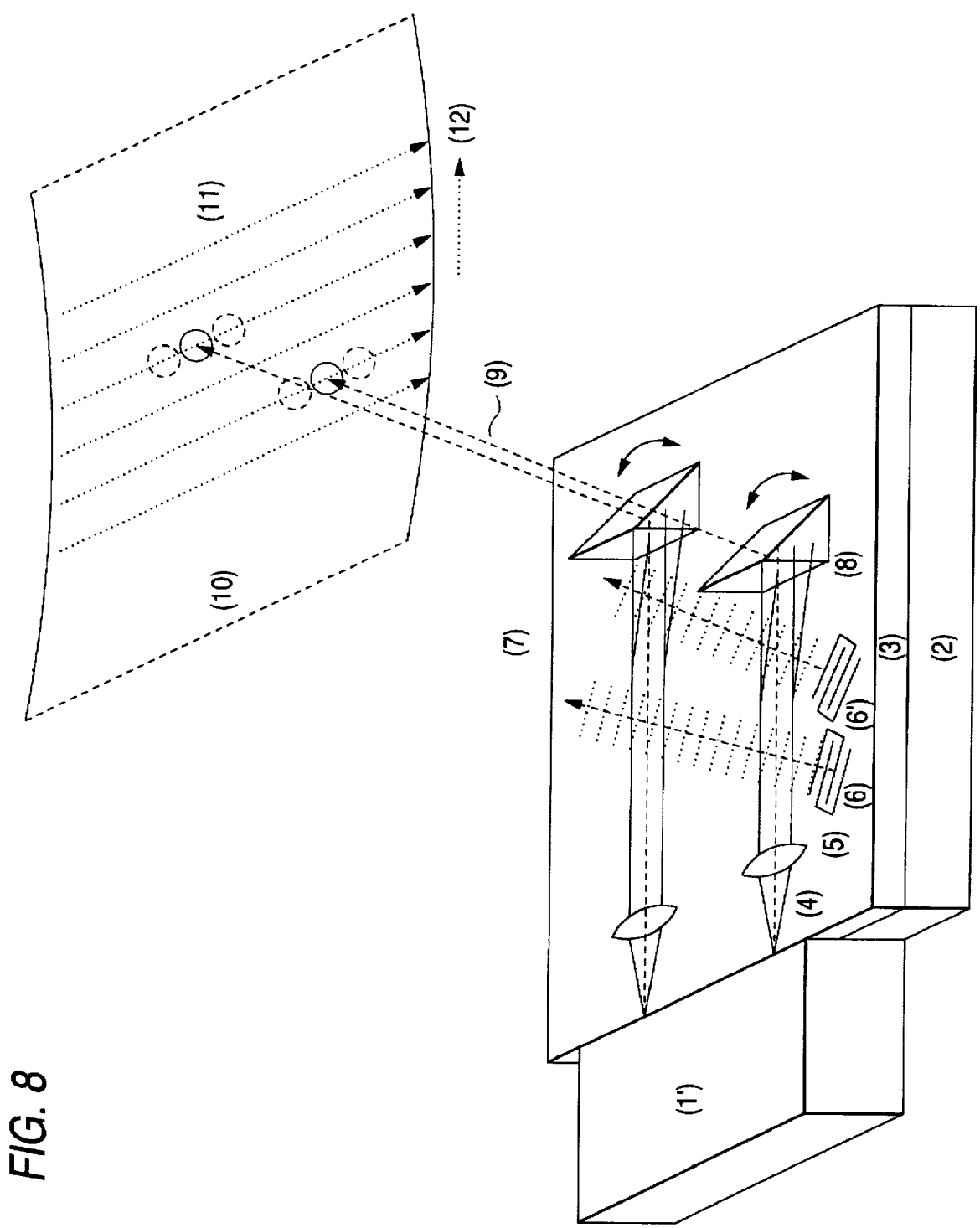
FIG. 8 is a diagram showing an interlace scanning operation using twice-diffraction method according to the present invention.

FIG. 8 is a diagram showing an interlace scanning operation using twice-diffraction method according to the present invention. In the figure, (6') designates a second chirp electrode.

Figure 9:
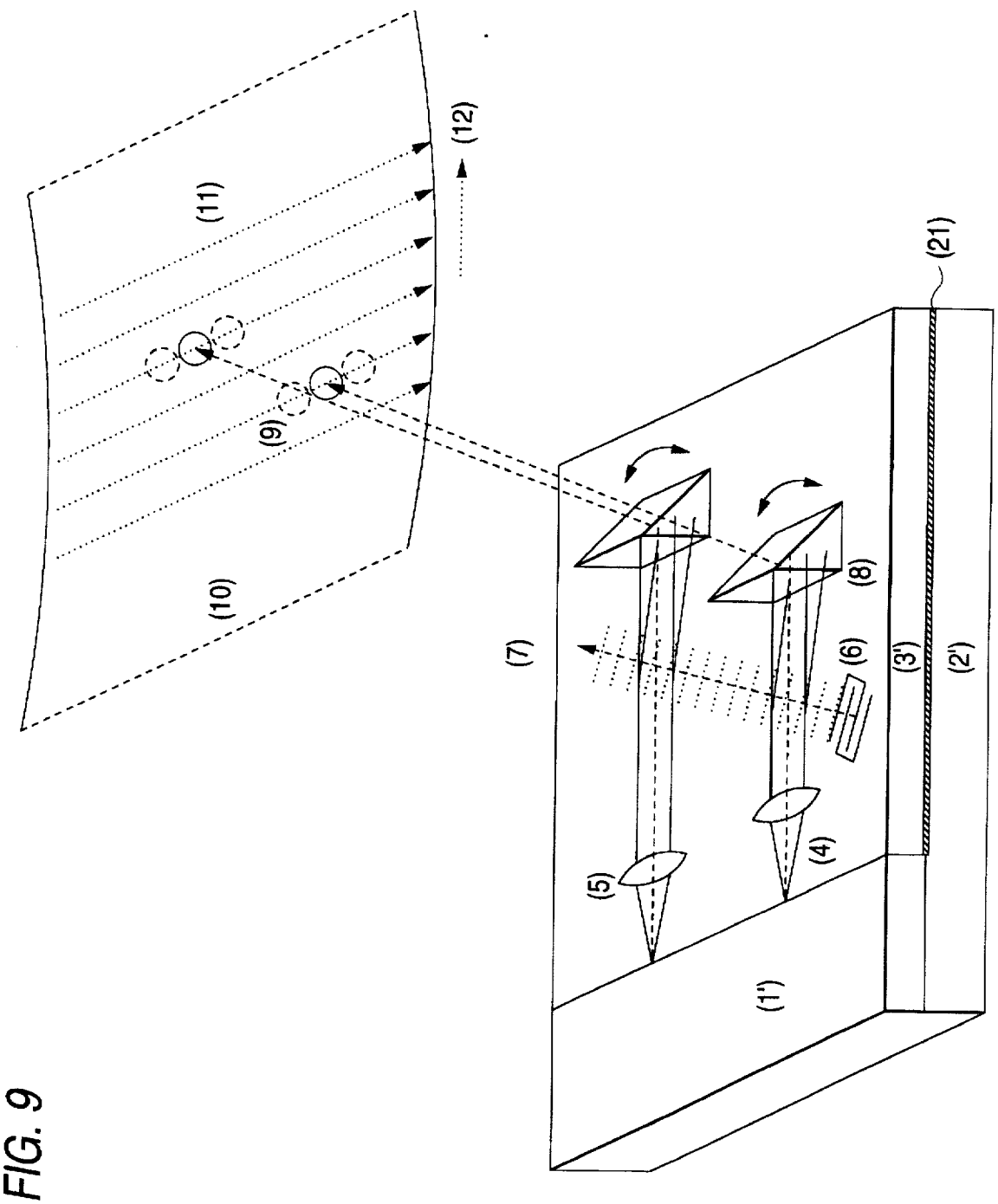
FIG. 9 is a diagram showing an embodiment of the present invention in which a dual-spot semiconductor laser as the light source, and the other components of the scanning device are provided on the same substrate.

FIG. 9 is a diagram showing an embodiment of the present invention in which a dual-spot semiconductor laser as the light source, and the other components of the scanning device are provided on the same substrate. In the figure, (2') designates a GaAs substrate, (3') designates a PZT thin film waveguide, and (21) designates an MgO buffer layer.

The present invention will be described in detail with reference to the following Embodiments, but the invention should not be construed as being limited thereto.

Embodiment 1

Figure 2:
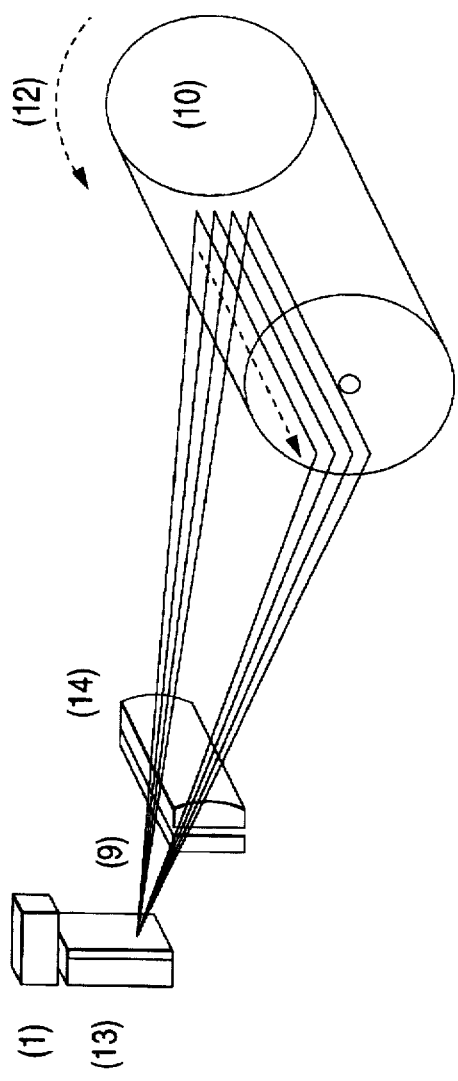
FIGS. 2(a) and 2(b) show schematic views of a printing system having an embodiment of the optical scanning device according to the present invention in which a 4-spot laser diode array is used.
Figure 2:
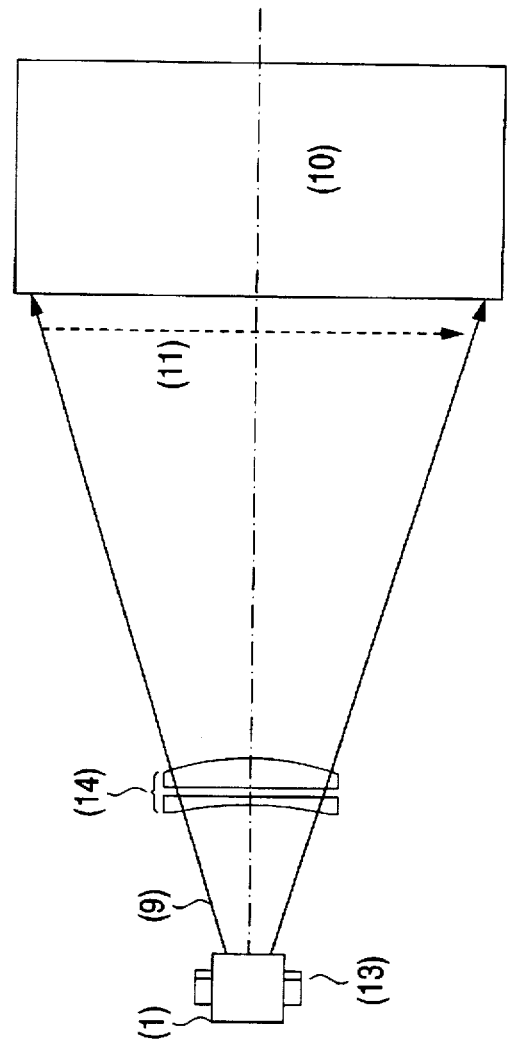

As shown in FIGS. 1 and 2, a thin film waveguide (3) is used which is formed on a single crystal $\alpha$-$Al_2O_3$ substrate (2) and which is made of $LiNbO_3$. A 4-spot laser diode array (1) in which each beam has an output power of 20 mW and total output power is 80 mW directly fixed to an end face of a thin film waveguide so as to conduct the butt coupling.

Incident laser beams (4) are collimated by mode index lenses (5) so as to have a laser beam width (D) of 8 mm, and thereafter deflected in digital modulation by a chirp electrode (6) in which the pitch of electrode fingers is changed in the propagation direction of a SAW (7).

As the means for emitting the deflected laser beams to the outside of the thin film waveguide, used are four gratings (8) which are located at the same position in a direction perpendicular to the traveling direction of the incident laser beams as shown in FIG. 1. The emittance angles of the gratings are set to be at equal angular intervals. The gratings are formed by depositing and patterning Ti so as to correspond to the laser beams, respectively, and then conducting oxidization to obtain $TiO_2$ diffraction gratings each having different grating intervals.

Then the emitted laser beams are used in the laser scanning in which a photoreceptor (10) is exposed through an optical system such as an F$\theta$ lens (14). The laser scanning is conducted by the interlace scanning operation for every four lines in the rotational direction (12) of the photosensitive drum or the scanning direction (11).

The optical scanning device had the following performance. When the band $\Delta f$ of the transducer was 800 MHZ and the laser wavelength $\lambda_0$=780 nm, the scanning time $t_d$ was 11.3 ms/line for each laser beam. Therefore, the apparent-scanning time $t_m$ for simultaneously scanning four lines was 2.8 ms/line. When the photoreceptor was exposed under these conditions, printing at 600 dots/inch could be conducted on about four sheets of A4-size paper per one minute, with the result that a practical printing speed was realized.

In an optical scanning method in which an optical scanning device that is used in a system where laser light is introduced into a thin film waveguide is used as means for a photoreceptor, it is usually known that the density of the laser exposure energy on the photoreceptor is reduced by optical losses occurring, for example, when laser light is coupled to the thin film waveguide, when the laser light is scattered in the thin film waveguide, when light is optically deflected by means of the acoustooptic effect, and when the laser light is output from the thin film waveguide.

In Embodiment 1 described above, by contrast, the four beam lasers simultaneously conduct the scanning operation so that the laser exposure energy density is four times that obtained in the case of using a single beam laser, with the result that, even when a loss of laser light occurs, it is possible to obtain on the photoreceptor a laser exposure energy density sufficient for exposure of the photoreceptor. Furthermore, as the means for emitting the deflected laser beams to the outside of the thin film waveguide, plural means having different emittance angles can be located at the same position in a direction perpendicular to the traveling direction of the incident laser beams. Therefore, the optical scanning device can be miniaturized.

Comparative Embodiment 1

A thin film waveguide made of $LiNbO_3$ which is the same as that of Embodiment 1 is used, and a single-spot laser diode having an output power of 20 mW was directly fixed to an end face of the thin film waveguide so as to conduct coupling. The incident laser beam of a laser beam width (D) of 8 mm is subjected to digital modulation in the same manner as in Embodiment 1.

The deflected laser beam is output by a grating to the outside of the thin film waveguide, and then used through an optical system such as a lens, for conducting the laser scanning exposure on a photoreceptor.

The optical scanning device had the following performance. When the band $\Delta f$ of the transducer was 800 MHZ and the laser wavelength $\lambda_0$=780 nm, the scanning time t was 11.3 ms/line. When the photoreceptor was exposed under these conditions, printing at 600 dots/inch could be conducted on only one or less sheet of A4-size paper per one minute. Such a low printing speed cannot be practically used.

Furthermore, 95% of the laser light was lost as a whole as a result of optical losses occurring when the laser light was coupled to the optical waveguide, when the laser light was scattered in the thin film waveguide, when light was optically deflected by means of the acoustooptic effect, when the laser light was output from the optical waveguide, etc. Consequently, a laser exposure energy density sufficient for exposure of the photoreceptor could not be obtained on the photoreceptor.

Comparative Embodiment 2

A thin film waveguide made of $LiNbO_3$ which is the same as that of Embodiment 1 is used, and a 4-spot laser diode array is directly fixed to an end face of the thin film waveguide so as to conduct coupling. The incident laser beams are subjected to digital modulation in the same manner as in Embodiment 1.

The deflected laser beams are output by a single grating which outputs the beams to the end face or the outside of the thin film waveguide, and then used through an optical system such as a lens, for conducting the laser scanning exposure on the photoreceptor.

The optical scanning device had the following performance. Although the band $\Delta f$ of the transducer was 800 MHZ, the laser wavelength $\lambda_0$ was 780 nm, and the 4-spot laser diode array was used as shown in FIG. 5, the laser scanning for exposing the photoreceptor through the optical system such as a lens could not be conducted by the interlace scanning operation in the rotational direction of the photosensitive drum or the simultaneous scanning operation for four lines.

Therefore, the optical scanning device could achieve at the most the scanning time t=11.3 ms/line which is the same as the performance attained when a single-spot laser diode was used.

When the photoreceptor was exposed under these conditions, printing at 600 dots/inch could be conducted on only one or less sheet of A4-size paper per one minute. Such a low printing speed cannot be practically used.

Embodiment 2

A thin film waveguide is used which is formed on a single crystal $\alpha$-Al$_2$O$_3$ substrate and which is made of ZnO. A dual-spot laser diode array is directly fixed to an end face of the thin film waveguide made of ZnO so as to conduct the coupling. The two incident laser beams are collimated by geodestic lenses, respectively. Thereafter, the laser beams are subjected to digital modulation by a first chirp electrode in which the pitch of electrode fingers is changed in the SAW propagation direction, and further to digital modulation by a second chirp electrode, so as to be diffracted two times, thereby doubling the angle of deflection.

As the means for emitting the deflected laser beams to the outside of the optical waveguide, used are two independent gratings which are located at the same position in a direction perpendicular to the traveling direction of the incident laser beams, and which have different emittance angles. Thereafter, the laser scanning for exposing the photoreceptor through an optical system such as a lens is conducted by the interlace scanning operation for every two lines in the rotational direction of the photosensitive drum.

Embodiment 3

A thin film waveguide which is produced by diffusing Ti into a single crystal substrate of LiNbO$_3$ is used. Collimated laser beams from a 4-spot laser diode array are introduced into the thin film waveguide through a prism coupling. The incident laser beams are subjected to digital modulation by a chirp electrode in which the pitch of electrode fingers is changed in the SAW propagation direction.

As the means for emitting the deflected laser beams to the outside of the thin film waveguide, used are a plurality of prisms which are located at the same position in a direction perpendicular to the traveling direction of the incident laser beams. The emittance angles of the prisms are set to be at equal angular intervals. The prisms correspond to the laser beams, respectively. Thereafter, the laser scanning for exposing the photoreceptor through an optical system such as a lens is conducted by the simultaneous scanning operation for four lines in the rotational direction of the photosensitive drum.

Embodiment 4

A thin film waveguide which is produced by diffusing Ti into a single crystal substrate of LiNbO$_3$ is used. Laser beams oscillated from two laser diodes are introduced into the thin film waveguide through a prism coupling. The incident laser beams are subjected to analog modulation by a chirp electrode in which the pitch of electrode fingers is changed in the SAW propagation direction.

As the means for emitting the deflected laser beams to the outside of the thin film waveguide, used are two independent prisms which are located at the same position in a direction perpendicular to the traveling direction of the incident laser beams, and which have different emittance angles. Thereafter, the laser scanning for exposing the photoreceptor through an optical system such as a lens is conducted by the interlace scanning operation for every two lines in the rotational direction of the photosensitive drum.

In this embodiment, analog modulation is employed, and hence the scanning speed is higher by two orders of magnitude than that in digital modulation. Specifically, printing at 85 µs/line and 1,200 dots/inch could be conducted on sixty or more sheets of A4-size paper per one minute. With respect to the scanning exposure speed, when a high scanning speed is to be attained at such a high density, the speed of the video rate for laser beam modulation rather than the laser beam scanning speed is in the rate-determining step. As a result, the video rate of about 800 Mbps is required. When a single laser diode is used, it is difficult to realize such a high video rate and the upper limit of the video rate is 400 Mbps. In this embodiment, the two laser diodes can simultaneously conduct the scanning exposure, and hence the video rate for each laser diode is 400 Mbps. Although this value is equal to that in the case of using a single laser diode, the apparent video rate is 800 Mbps which is two times that in the case of using the single laser diode. Consequently, high speed scanning exposure which is twice in speed the case of using a single laser diode can be realized.

Embodiment 5

A thin film waveguide which is made of epitaxial PZT grown through an epitaxial MgO buffer layer on a GaAs substrate is used. The substrate has a dual-spot semiconductor laser diode array provided on a part thereof as shown in FIG. 9. The semiconductor laser is produced on the GaAs substrate by growing a multilayer structure of AlGaAs by the MOCVD method and by diffusing Si into a portion which does not function as the laser cavity. The MgO layer is grown and formed on the same GaAs substrate by the electron beam vapor deposition method, and the PZT layer by the Rf sputtering method. The semiconductor laser and the optical scanning device are integrated on the same substrate. The embodiment has a structure in which the thin film waveguide of the laser unit and the PZT thin film waveguide are arranged in series and the laser beams generated by the oscillation of the semiconductor laser are introduced into the PZT thin film waveguide. The two incident laser beams are collimated by geodestic lenses. Thereafter, the laser beams are subjected to digital modulation by a first chirp electrode in which the pitch of electrode fingers is changed in the SAW propagation direction, and further by digital modulation by a second chirp electrode, so as to be diffracted two times, thereby doubling the angle of deflection.

As the means for emitting the deflected laser beams to the outside of the thin film waveguide, used are two independent gratings which are located at the same position in a direction perpendicular to the traveling direction of the incident laser beams, and which have different emittance angles. Thereafter, the laser scanning for exposing the photoreceptor through an optical system such as a lens is conducted by the interlace scanning operation for every two lines in he rotational direction of the photosensitive drum.

Embodiment 6

Figure 4:
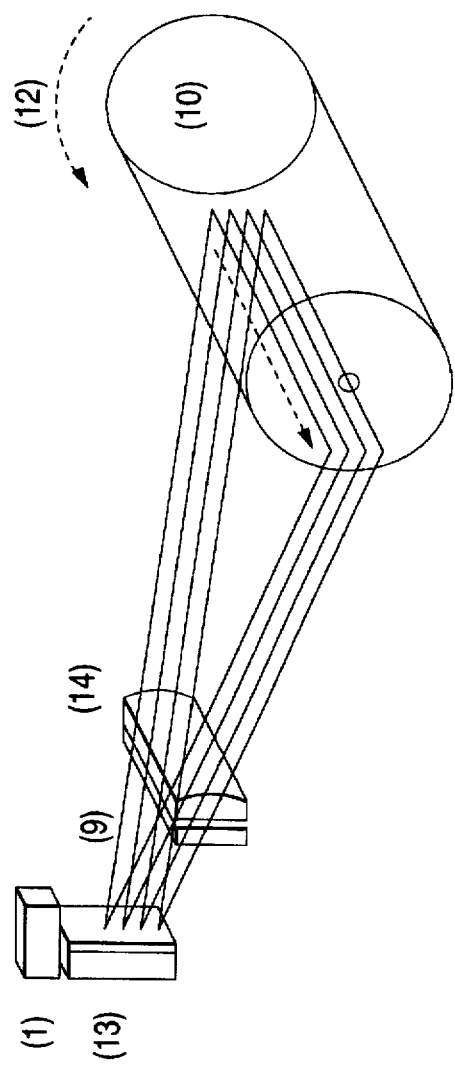
FIGS. 4(a) and 4(b) show schematic views of a printing system having another embodiment of the optical scanning device according to the present invention in which a 4-spot laser diode array is used.
Figure 4:
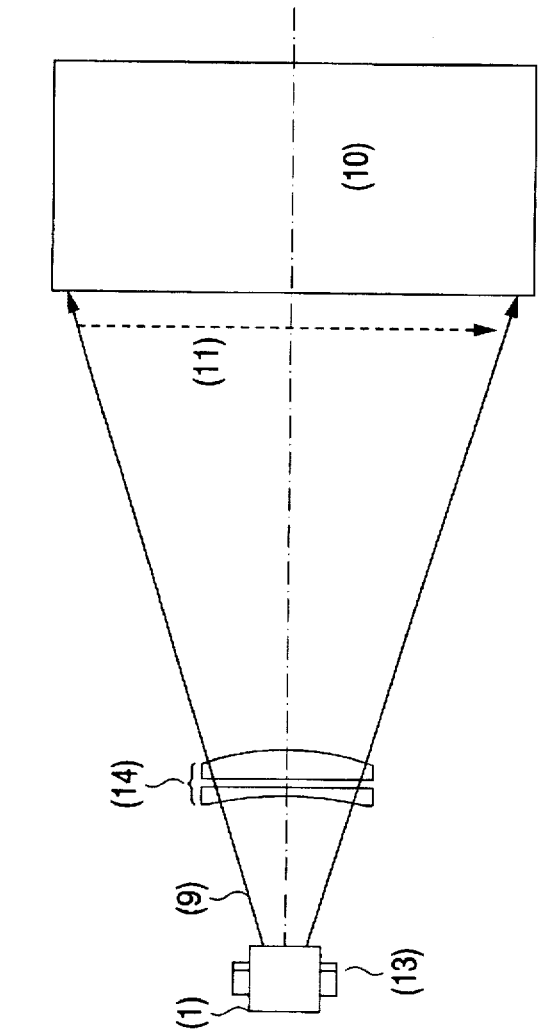

As shown in FIGS. 3 and 4, a thin film waveguide (3) is used which is formed on a single crystal $\alpha$-Al$_2$O$_3$ substrate (2) and which is made of LiNbO$_3$. A 4-spot laser diode array (1) in which each beam has an output power of 20 mW and the total output power is 80 mW is directly fixed to an end face of the thin film waveguide so as to conduct the butt coupling.

Incident laser beams (4) are collimated by mode index lenses (5) so as to have a laser beam width (D) of 8 mm, and thereafter deflected in digital modulation by a chirp electrode (6) in which the pitch of electrode fingers is changed in the propagation direction of a SAW (7).

As the means for emitting the deflected laser beams to the outside of the thin film waveguide, used are four gratings (8)

which are located at appropriate intervals in the traveling direction of the light, have the same emittance angles, and correspond to the laser beams, respectively, as shown in FIG. 3. The gratings is made of a $TiO_2$ diffraction grating which is produced by depositing and patterning Ti and then conducting oxidization. Each of the gratings has a diffraction grating having the same grating interval.

Then the emitted laser beams are used in the laser scanning in which a photoreceptor (10) is exposed through an optical system such as an Fθ lens (14). The laser scanning is conducted by the interlace scanning operation for every four lines in the rotational direction (12) of the photosensitive drum or the scanning direction (11).

The optical scanning device had the following performance. When the band $\Delta f$ of the transducer was 800 MHZ and the laser wavelength $\lambda_0=780$ nm, the scanning time $t_d$ was 11.3 ms/line for each laser beam. Therefore, the apparent scanning time $t_m$ for simultaneously scanning four lines was 2.8 ms/line.

When the photoreceptor was exposed under these conditions, printing at 600 dots/inch could be conducted on about four sheets of A4-size paper per one minute, with the result that a practical printing speed was realized.

In this Embodiment, the four beam lasers simultaneously conduct the scanning operation so that the laser exposure energy density is four times that obtained in the case of using a single beam laser, with the result that, even when a loss of laser light occurs, it is possible to obtain on the photoreceptor a laser exposure energy density sufficient for exposure of the photoreceptor. Furthermore, the means for emitting the deflected laser beams to the outside of the optical waveguide have the same emittance angle, and hence the positional accuracy among the emitted beams can be improved.

Embodiment 7

A thin film waveguide is used which is formed on a single crystal $\alpha\text{-}Al_2O_3$ substrate and which is made of ZnO. A dual-beam laser diode array is directly fixed to an end face of the thin film waveguide so as to conduct the coupling.

The two incident laser beams are collimated by geodestic lenses, respectively. Thereafter, the laser beams are subjected to digital modulation by a first chirp electrode in which the pitch of electrode fingers is changed in the SAW propagation direction, and further to digital modulation by a second chirp electrode, so as to be diffracted two times, thereby doubling the angle of deflection.

The deflected laser beams are emitted by a plurality of gratings which have the same emittance angle in the traveling direction of light and are located at appropriate intervals in the traveling direction of light. Then the emitted laser beams are used in the laser scanning in which a photoreceptor was exposed through an optical system such as a lens. The laser scanning is conducted by the interlace scanning operation for every two lines in the rotational direction of the photosensitive drum.

Embodiment 8

A thin film waveguide which is produced by diffusing Ti into a single crystal substrate of $LiNbO_3$ is used. Collimated laser beams from a 4-spot laser diode array are introduced into the thin film waveguide through a prism coupling. The incident laser beams are subjected to digital modulation by a chirp electrode in which the pitch of electrode fingers is changed in the SAW propagation direction.

The deflected laser beams are emitted to the outside of the thin film waveguide by prisms which have the same emittance angle in the traveling direction of light and are located at appropriate intervals in the traveling direction of light. Then the laser scanning for exposing the photoreceptor through an optical system such as a lens is conducted by the simultaneous scanning operation for four lines in the rotational direction of the photosensitive drum.

Embodiment 9

A thin film waveguide which is produced by diffusing Ti into a single crystal substrate of $LiNbO_3$ is used. Laser beams oscillated from two laser diodes are introduced into the thin film waveguide through a prism coupling. The incident laser beams are subjected to analog modulation by a chirp electrode in which the pitch of electrode fingers is changed in the SAW propagation direction.

The deflected laser beams are emitted to the outside of the thin film waveguide by prisms which are located at appropriate intervals in the traveling direction of light. Then the laser scanning for exposing the photoreceptor through an optical system such as a lens is conducted by the simultaneous scanning operation for two lines in the rotational direction of the photosensitive drum.

In this embodiment, analog modulation is employed, and hence the scanning speed is higher by two orders of magnitude than that in digital modulation. Specifically, printing at 85 µs/line and 1,200 dots/inch could be conducted on sixty or more sheets of A4-size paper per one minute. With respect to the scanning exposure speed, when a high scanning speed is to be attained at such a high density, the speed of the video rate for laser beam modulation rather than the laser beam scanning speed is in the rate-determining step. As a result, the video rate of about 800 Mbps is required. When a single laser diode is used, it is difficult to realize such a high video rate and the upper limit of the video rate is 400 Mbps. In this embodiment, the two laser diodes can simultaneously conduct the scanning exposure, and hence the video rate for each laser diode is 400 Mbps. Although this value is equal to that in the case of using a single laser diode, the apparent video rate is 800 Mbps which is two times that in the case of using the single laser diode. Consequently, high speed scanning exposure which is twice in speed the case of using a single laser diode can be realized.

Embodiment 10

A thin film waveguide is used which is made of epitaxial PZT grown through an epitaxial MgO buffer layer on a dual-beam laser diode array. The semiconductor laser is produced by growing a multilayer structure of AlGaAs by the MOCVD method and by diffusing Si into a portion which does not function as the laser cavity. The MgO layer is grown by the electron beam vapor deposition method, and the PZT layer by the Rf sputtering method. The semiconductor laser and the optical scanning device are integrated on the same substrate. The embodiment has a structure in which the thin film waveguide of the laser unit and the PZT thin film waveguide are arranged in series and the laser beams generated by the oscillation of the semiconductor laser are introduced into the PZT thin film waveguide. The two incident laser beams are collimated by geodestic lenses. Thereafter, the laser beams are subjected to digital modulation by a first chirp electrode in which the pitch of electrode fingers is changed in the SAW propagation direction, and further to digital modulation by a second chirp electrode, so as to be diffracted two times, thereby doubling the angle of deflection.

The deflected laser beams are emitted by gratings which are located at appropriate intervals in the traveling direction of light so as to emit laser beams to the outside of the optical waveguide. Then the emitted laser beams are used in the laser scanning in which a photoreceptor is exposed through an optical system such as a lens. The laser scanning is conducted by the interlace scanning operation for every two lines in the rotational direction of the photosensitive drum.

In the optical scanning device of the optical waveguide type of the present invention, a plurality of laser beams can be used at the same time in simultaneous scanning or interlace scanning, and hence the laser scanning speed and the laser recording speed can be improved. Consequently, the application range of the device can be expanded to a laser beam printer, a digital copier, a facsimile apparatus, etc.

When the constitution in which a plurality of means having different emittance angles are located at the same position in a direction perpendicular to the traveling direction of the incident laser beams is used as means for emitting deflected laser beams to the outside of the thin film waveguide, the optical scanning device can be miniaturized. When the constitution in which such means having the same emittance angle are located at specific intervals is used, the positional accuracy among the emitted beams can be improved.

In the image forming apparatus of the invention, the optical scanning device is used as exposure means for a photoreceptor, and hence an image can be formed at a high scanning speed.

While the invention has been described in detail and with reference to specific embodiments thereof, it will be apparent to one skilled in the art that various changes and modifications can be made without departing from the spirit and scope thereof.

What is claimed is:

1. An optical scanning device comprising:
   a thin film waveguide;
   a light source for emitting a plurality of laser beams to said thin film waveguide;
   a comb-like electrode for exciting a surface acoustic wave for deflecting the laser beams in said thin film waveguide; and
   a plurality of emitting means for emitting the deflected laser beams to an outside of said thin film waveguide, said emitting means being equal in number to the laser beams.

2. The optical scanning device according to claim 1, wherein said light source is a laser array which oscillates a plurality of laser beams.

3. The optical scanning device according to claim 1, wherein said plurality of emitting means are located at the same position in a traveling direction of the incident laser beams, and have different emittance angles.

4. The optical scanning device according to claim 2, wherein said plurality of emitting means are located at the same position in a traveling direction of the incident laser beams, and have different emittance angles.

5. The optical scanning device according to claim 3, wherein, when the number of said plurality of emitting means is three or more, the emittance angles are set to be at equal angular intervals.

6. The optical scanning device according to claim 4, wherein, when the number of said plurality of emitting means is three or more, the emittance angles are set to be at equal angular intervals.

7. The optical scanning device according to claim 1, wherein said plurality of emitting means are located at different positions in a traveling direction of the incident laser beams, and have the same emittance angle.

8. The optical scanning device according to claim 2, wherein said plurality of emitting means are located at different positions in a traveling direction of the incident laser beams, and have the same emittance angle.

9. The optical scanning device according to claim 7, wherein, when the number of said plurality of emitting means is three or more, the emittance positions are set to be at equal intervals.

10. The optical scanning device according to claim 8, wherein, when the number of said plurality of emitting means is three or more, the emittance positions are set to be at equal intervals.

11. The optical scanning device according to claim 1, wherein each of said emitting means comprises a grating or a prism.

12. The optical scanning device according to claim 1, wherein said comb-like electrode includes a plurality of comb-like electrodes per a laser beam.

13. The optical scanning device according to claim 1, further comprising a substrate, wherein said light source and said thin film waveguide are provided on the single substrate.

14. An image forming apparatus comprising:
   a photoreceptor;
   charging means for uniformly charging said photoreceptor;
   exposing means for irradiating said photoreceptor with light to form a latent image; and
   developing means for visualizing the latent image, wherein said exposure means is an optical scanning device comprising:
   a thin film waveguide;
   a light source for emitting a plurality of laser beams to said thin film waveguide;
   a comb-like electrode for exciting a surface acoustic wave for deflecting the laser beams in said thin film waveguide; and
   a plurality of emitting means for emitting the deflected laser beams to an outside of said thin film waveguide, said emitting means being equal in number to the laser beams.

15. The image forming apparatus according to claim 14, wherein the laser beams emitted from said emitting means are used in simultaneous scanning or interlace scanning for plural lines in a subscanning direction of said photoreceptor.

* * * * *